United States Patent
Kanazawa et al.

(10) Patent No.: US 8,223,060 B2
(45) Date of Patent: Jul. 17, 2012

(54) ELECTRIC CONTROL SYSTEM AND ELECTRIC CONTROL UNIT

(75) Inventors: Akira Kanazawa, Yokkaichi (JP); Tatsuji Matsumoto, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 624 days.

(21) Appl. No.: 12/310,990

(22) PCT Filed: Sep. 21, 2007

(86) PCT No.: PCT/JP2007/068403
§ 371 (c)(1),
(2), (4) Date: Mar. 16, 2009

(87) PCT Pub. No.: WO2008/035766
PCT Pub. Date: Mar. 27, 2008

(65) Prior Publication Data
US 2009/0262000 A1 Oct. 22, 2009

(30) Foreign Application Priority Data
Sep. 21, 2006 (JP) .................. 2006-256040

(51) Int. Cl.
*H04L 17/02* (2006.01)
*G01M 17/00* (2006.01)
(52) U.S. Cl. ............... 341/176; 701/44; 701/46; 701/36
(58) Field of Classification Search ............... 340/870.7; 701/33, 35
See application file for complete search history.

(56) References Cited

U.S. PATENT DOCUMENTS

| 7,239,946 | B2 * | 7/2007 | Sowa | 701/31.4 |
|---|---|---|---|---|
| 7,711,461 | B2 * | 5/2010 | Yokogawa | 701/33 |
| 2004/0024796 | A1 | 2/2004 | Takeda et al. | |
| 2004/0236488 | A1 | 11/2004 | Predelli | |
| 2006/0047384 | A1 * | 3/2006 | Robinson et al. | 701/35 |

(Continued)

FOREIGN PATENT DOCUMENTS

DE 197 43 666 A1 4/1999

(Continued)

OTHER PUBLICATIONS

German Office Action issued in Application No. 11 2007 002 219.1-34; Dated Nov. 19, 2010 (With Translation).

*Primary Examiner* — Stephen W Jackson
*Assistant Examiner* — Angela Brooks
(74) *Attorney, Agent, or Firm* — Oliff & Berridge, PLC

(57) ABSTRACT

A plurality of electric control units are connected to perform data-communication through a communication line. Each electric control unit comprises a recording means for recording data and a communication means, to control an operation of an object to be controlled. One of the plurality of electric control units determines whether it is possible to record data in the recording means, and records the data in the recording means when it determines that it is possible to record the data in the recording means. The "one of the plurality of electric control units" transmits the data to other electric control unit when it determines that it is not possible to record the data in the recording means. The "other electric control unit" receives the transmitted data and records it in own recording means.

20 Claims, 5 Drawing Sheets

U.S. PATENT DOCUMENTS

| | | | |
|---|---|---|---|
| 2006/0047385 A1* | 3/2006 | Robinson et al. | 701/35 |
| 2006/0089767 A1* | 4/2006 | Sowa | 701/29 |
| 2006/0190553 A1 | 8/2006 | Kojima | |
| 2007/0021890 A1* | 1/2007 | Ide | 701/44 |
| 2008/0208533 A1 | 8/2008 | Yokogawa | |
| 2009/0012924 A1* | 1/2009 | Ide | 706/46 |
| 2009/0118903 A1* | 5/2009 | Kimura et al. | 701/36 |

FOREIGN PATENT DOCUMENTS

| | | |
|---|---|---|
| DE | 101 62 853 C1 | 6/2003 |
| JP | A-09-160602 | 6/1997 |
| JP | A-11-212870 | 8/1999 |
| JP | A-2002-193070 | 7/2002 |
| JP | A-2004-038388 | 2/2004 |
| JP | A-2006-199096 | 8/2006 |
| JP | A-2006-235990 | 9/2006 |
| WO | WO 02/054221 A2 | 7/2002 |
| WO | WO 2005/010759 A1 | 2/2005 |
| WO | WO 2006/077900 A2 | 7/2006 |
| WO | WO 2006077900 A2 * | 7/2006 |

* cited by examiner

F I G. 5

| ECU ID | FREE SPACE | PRIORITY ORDER | RECORD DESTINATION | RECORD POSSIBILITY |
|---|---|---|---|---|
| 0001 | 100000 | 5 | 0001 | 1 |
| 0002 | 10000 | 4 | 0002 | 1 |
| 0003 | 30 | 3 | 0001 | 1 |
| 0004 | 0 | 0 | 0001 | 0 |
| ⋮ | ⋮ | ⋮ | ⋮ | ⋮ |

ELECTRIC CONTROL SYSTEM AND ELECTRIC CONTROL UNIT

This National Stage application claims priority under 35 U.S.C. 119 (a) on Patent Application No. PCT/JP 2007/068403 internationally filed on Sep. 21, 2007, the entire contents of which are hereby incorporated by reference.

BACKGROUND OF THE INVENTION

1. Field of the Invention

The present invention relates to an electric control system that can control a transmission and a receive of log data among a plurality of control units through a communication line, and relates to an electric control unit.

2. Description of Related Art

In a case of using an electric control unit (hereinafter referred to as ECU) to control an operation of an engine for a vehicle, the ECU includes: a recording medium such as a RAM that records detection data calculated on the basis of a detection signal from a sensor for detecting an operating state of the vehicle; log data generated in a case of determining that an abnormality has occurred in operation data representing a control amount of a fuel injection amount, an ignition timing and the like which are calculated on the basis of the detection data; log data configured by diagnostic result data which is obtained at regular intervals by diagnosing whether or not an abnormality has occurred in the ECU body, or the like.

For example, in Japanese Patent Application Laid-Open No. H09-160602 (1997) shows a system having a plurality of ECUs. When one of the ECUs in the system detects an occurrence of a failure, the one of the ECU records control signals before and after the detection of the failure and transmits abnormal signals to other ECU. Meanwhile, the "other ECU" having received the abnormal signal records control signals before and after the reception of the abnormal signal. In this manner, it is possible to record control signals at the time of the abnormality, by the plurality of ECUs.

Further, in Japanese Patent Application Laid-Open No. 2002-193070, when an abnormality occurs in one ECU, this ECU collects control signals of other related ECUs through a network and records the collected signals in a built-in recording means along with own abnormal information. In this manner, it is possible to collectively record related abnormal information, to help analysis for the cause.

SUMMARY OF THE INVENTION

However, in Japanese Patent Application Laid-Open No. H09-160602 (1997), the system causes heavy workloads to manage recording of control signals because a plurality of ECUs record control signals. Further, when the system has data that needs to record for later analysis, such as at the time of an abnormality or at the time of collection of diagnostic result data, one of the ECUs might have insufficient recording capacity in own recording means. Moreover, when the recording means of the ECU is under a failure, the system cannot obtain required data. Therefore, there is a problem that the system may not be able to record the data which should be recorded, in the cases described above.

On the other hand, in Japanese Patent Application Laid-Open No. 2002-193070, each of the ECU requires a recording means that provides large recording capacity, because several information are recorded in a single ECU when an abnormality occurs in the ECU. Therefore, there is a problem that the system may not be able to record the data which should be recorded, in the cases that the recording capacity is insufficient due to recording a large amount of other data or that the recording means of the ECU is under a failure.

The present invention is made in view of such circumstances, and has an object to provide an electric control system that can record data which should be recorded in one of the ECUs or in other ECU in the system without a loss of the data, even when the "one of the ECUs" does not have a sufficient recording capacity or when the recording means of the one of the ECUs is under a failure. Further the present invention has an object to provide such an electric control unit (ECU).

In order to achieve the above object, an electric control system according to a first aspect comprises: a recording means for recording plural data; a communication means; and a plurality of electric control units that are connected each other to perform data communication through a communication line for controlling an operation of an object to be controlled, wherein one electric control unit comprises: a determining means for determining whether a data can be recorded in the recording means; a record controlling means for recording the data in the recording means when the determining means determines that the data can be recorded in the recording means; a transmitting means for transmitting the data to another electric control unit when the determining means determines that the data can not be recorded in the recording means, and the another electric control unit comprises: a receiving means for receiving the data; and a record managing means for recording the received data in the recording means.

The electric control system according to a second aspect is configured such that in the first aspect, wherein the plurality of electric control units consist of not less than three electric control units; the electric control system further comprises: an information communicating means for transmitting and receiving information that represents a possibility of alternative record, between the one electric control unit and the other electric control units, when the determining means determines that the data can not be recorded in the recording means, wherein the one unit is allowed to transmit the data to an electric control unit that is capable of alternative record.

The electric control system according to a third aspect is configured such that in the second aspect, the information communicating means comprises: a data amount transmitting means for transmitting a data amount information of the data from the one electric control unit; and a determine result transmitting means for transmitting a determined result whether alternative record is possible or not, from the another electric control unit to the one electric control unit after receiving the data amount information of the data by the another electric control unit.

The electric control system according to a fourth aspect is configured such that in the third aspect, when the one electric control unit receives a determined result that represents alternative record is not possible, the information communicating means transmits and receives the information that represents a possibility of alternative record, between the plurality of electric control units excluding the another electric control unit.

The electric control system according to a fifth aspect is configured such that in the third aspect, the one electric control unit transmits the data to an electric control unit that is first to transmit a determined result representing that alternative record is possible.

The electric control system according to a sixth aspect is configured such that in the second aspect, the information communicating means comprises: a request transmitting means for transmitting a request of alternative record from the one electric control unit; and a record capacity information transmitting means for transmitting a record capacity information that is possible to apply for the alternative record, to the one electric control unit from the another electric control unit after receiving the request.

The electric control system according to a seventh aspect is configured such that in the sixth aspect, the one electric control unit transmits the data to an electric control unit that transmits a largest record capacity information.

The electric control system according to an eighth aspect includes, in the first aspect, a table for registering an electric control unit to which the data should be transmitted.

The electric control system according to a ninth aspect is configured such that in the eighth aspect, the table registers an electric control unit to which the data should not be transmitted.

The electric control system according to a tenth aspect is configured such that in the eighth aspect, the table registers a priority level with respect to an electric control unit to which the data should be transmitted.

The electric control system according to an eleventh aspect is configured such that in any one of the eighth to tenth aspects, each of the plurality of electric control units comprises the table.

The electric control system according to a twelfth aspect is configured such that in any one of the eighth to tenth aspects, a predetermined electric control unit comprises the table; the one electric control unit accesses the table when the determining means determines that the data can not be recorded in the recording means.

The electric control system according to a thirteenth aspect is configured such that in the second aspect, the another electric control unit comprises a success or failure transmitting means for transmitting the success or failure of the alternative record to the one electric control units; and the one electric control unit is allowed to transmit the data to an electric control unit that is different from the another electric control unit, when receiving the failure of the alternative record.

The electric control system according to a fourteenth aspect is configured such that in the second aspect, the another electric control unit comprises a success or failure determining means for determining the success or failure of the alternative record and a transferring means for transferring the possibility of alternative record transmitted from the one electric control unit, to an electric control unit that is different from the another electric control unit.

The electric control system according to a fifteenth aspect includes, in the first aspect, an identification storing means for storing an identification information to identify an electric control unit that has recorded the data.

The electric control system according to a sixteenth aspect is configured such that in the first aspect, the plurality of electric control units comprise abnormality detecting means for detecting an abnormality with respect to the operation of the object to be controlled; and the data represents to have detected the abnormality with respect to the operation of the object to be controlled.

The electric control system according to a seventeenth aspect is configured such that in the first aspect, the plurality of electric control units comprise self-diagnosing means for self-diagnosing whether functioning properly or not; and the data represents information corresponding to a diagnostic result by the self-diagnosing means.

The electric control unit according to an eighteenth aspect is an electric control unit that controls an operation of an object to be controlled, comprising: a determining means for determining whether data can be recorded in a recording means for recording data; a record controlling means for recording the data in the recording means when the determining means determines that the data can be recorded in the recording means; and an external outputting means for outputting the data externally when the determining means determines that the data can not be recorded in the recording means.

The electric control unit according to a nineteenth aspect includes, in the eighteenth aspect, a detecting means for detecting an abnormality with respect to the operation of the object to be controlled, wherein the data represents to have detected the abnormality with respect to the operation of the object to be controlled.

The electric control unit according to a twentieth aspect includes, in the eighteenth aspect, a self-diagnosing means for self-diagnosing whether functioning properly or not, wherein the data represents information corresponding to a diagnostic result by the self-diagnosing means.

In the first and eighteenth aspects, the plurality of electric control units, each having the recording means for recording data and the communication means and controlling an operation of an object to be controlled, are connected to perform data-communication through a communication line. One electric control unit determines whether or not a prescribed data can be recorded in the recording means. When it is determined that the data can be recorded, the data is recorded in the recording means. When it is determined that the data cannot be recorded, the data is transmitted to another electric control unit. This "another electric control unit" records the received data in own recording means. Therefore, even when the one electric control unit has the recording means which cannot record the data in a case such the recording means has insufficient amounts of remaining capacity for recording or defects, it is possible to record the data in a recording means of another electric control unit that is connected through the communication means. Thus, there are advantages to prevent data loss and to enhance reliability for recording data.

In the second aspect, even when there are some electric control units that are capable of alternative record, one of the "some electric control units" records the data alternatively. Therefore, it is possible to save the capacity for recording data.

In the third to fifth aspects, the one electric control unit informs a data amount for alternative record to another electric control unit. This another electric control unit checks whether own remaining recording capacity is not less than the data amount which is informed or not, then sends the check result to the one electric control unit.

In the fourth aspect, the other electric control units can perform the procedure described above. Then, the data that can not be recorded by the one electric control unit is transmitted to an electric control unit that has sent the check result representing recordable.

In the fifth aspect, the one electric control unit can inform a data amount for alternative record simultaneously to other electric control units. Then, the data that can not be recorded by the one electric control unit is transmitted to an electric control unit of the first that has sent the check result representing recordable. Therefore, it is possible to perform the alternative record promptly.

In the sixth and seventh aspects, a request for alternative record can be transmitted to other electric control units (plural number). After receiving the request, each of the "other electric control unit" transmits a record capacity information that is possible to apply for the alternative record, to the one electric control unit. The one electric control unit transmits the data that can not be recorded to an electric control unit that has transmitted a largest record capacity information among the "other electric control units". Therefore, it is possible to prevent an electric control unit with insufficient recording capacity from heavy workloads, by selecting preferentially an electric control unit with larger record capacity.

In the eighth to twelfth aspects, an access to the table allows to find quickly a, recordable electric control unit, and to perform the alternative record immediately.

In the thirteenth and fourteenth aspects, it is possible to deal with a case where the alternative record is failed, after finding an electric control unit for the alternative record and transmitting the data to be recorded alternatively. The thirteenth aspect allows the one electric control unit to initiate further procedure for the alternative record.

On the other hand, the fourteenth aspect allows an electric control unit that has failed the alternative record to initiate further procedure for the alternative record, by transferring information corresponding to the alternative record to another electric control unit.

Thus, it is possible to ensure the alternative record.

In the fifteenth aspect, there is information stored to identify the electric control unit which has performed the alternative record. Therefore, it is possible to find the electric control unit which has performed the alternative record.

In the sixteenth and nineteenth aspects, the one electric control unit includes an abnormality detecting means for detecting an abnormality with respect to the operation of "the object to be controlled". Further, the one electric control unit can record information indicating a detection of the abnormality. Therefore, it is possible to ensure recording data for abnormality without loss. Thus, the aspects lead advantages to save investigation time for the cause of the abnormality.

In the seventeenth and twentieth aspects, the one electric control unit includes a self-diagnosing means for self-diagnosing whether functioning properly or not. Further, the one electric control unit can record information for self-diagnosing results. Therefore, it is possible to ensure recording data for periodic diagnosis or the like without loss. Thus, the aspects lead advantages to make analysis for sign/precursor of abnormality feasible.

According to the present invention, even when data cannot be recorded in a recording means provided in an electric control unit because of e.g. recording capacity full failure or recording means failure, it is possible to ensure recording data in recording means provided in another unit connected through a communication means. Therefore, the present invention has advantages to make data-record reliable, without loss.

BRIEF DESCRIPTION OF THE DRAWINGS

The above and further objects and features of the invention will more fully be apparent from the following detailed description with accompanying drawings.

FIG. 5 is an explanatory view showing an example of contents of a table provided in an ECU.

DESCRIPTION OF THE PREFERRED EMBODIMENTS

Figure 1:
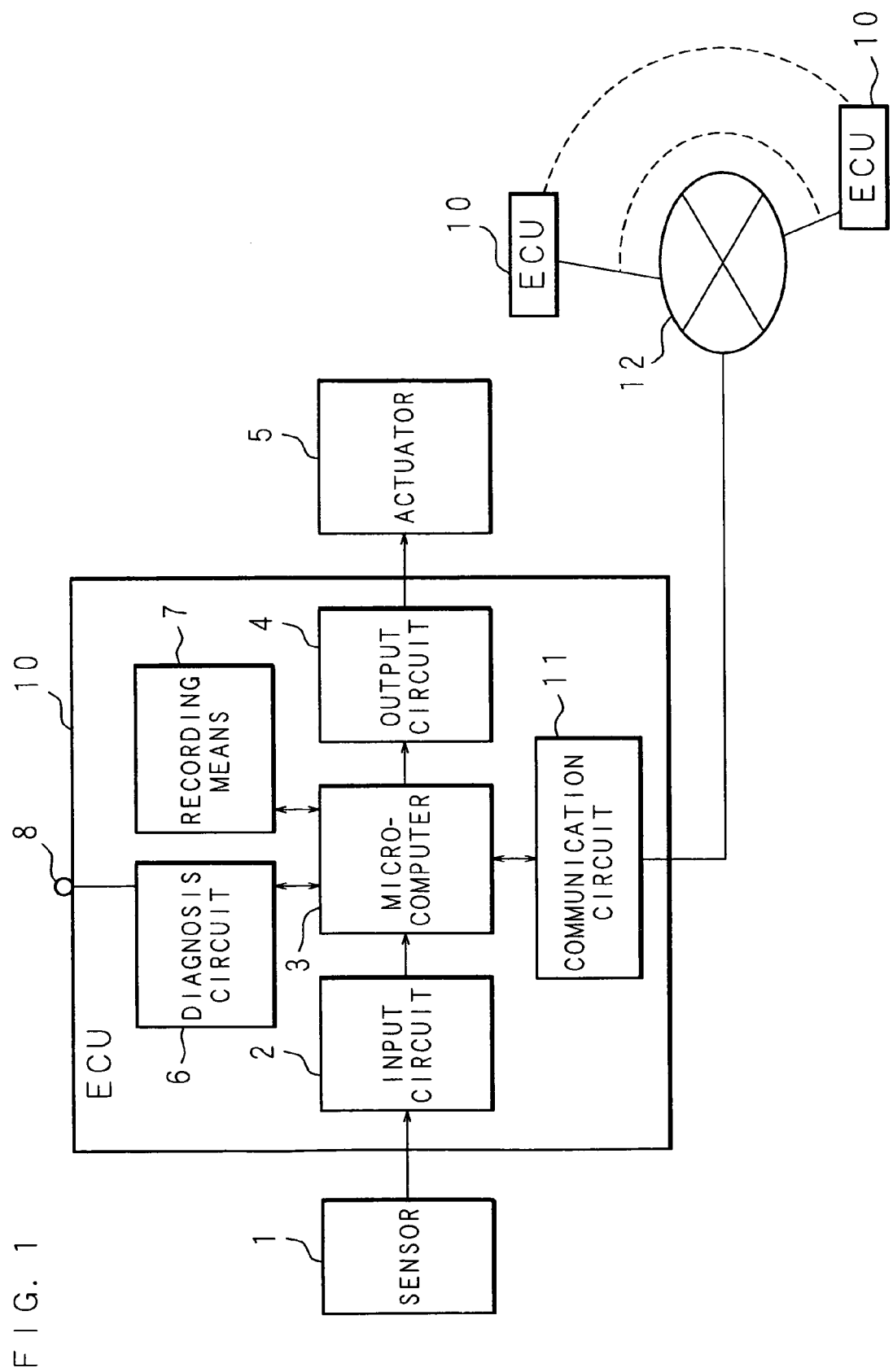
FIG. 1 is a block diagram schematically showing a configuration of a vehicle information system with an ECU according to an embodiment of the present invention applied thereto.

Hereinafter, an embodiment of the present invention is described in detail with reference to drawings. In the present embodiment, a description is given by taking an example that applies an electric control unit (hereinafter referred to as ECU) according to the embodiment of the present invention to a vehicle information system. FIG. 1 is a block diagram that schematically shows a configuration of the vehicle information system with the ECU according to the embodiment of the present invention applied thereto.

As shown in FIG. 1, the vehicle information system according to the present embodiment is provided in an automobile equipped with an engine, and consists of a plurality of control units to control the respective parts of the automobile integrally. The vehicle information system provides a large number of ECUs 10, 10, . . . that are connected each other through a network 12, such as an ECU 10 for EFI (Electric Fuel Injection) that controls drives of an injector, an igniter, an idling-rotation-number control step motor, and the like; an ECU 10 that controls drives of a solenoid valve for controlling hydraulic pressure and the like; and an ECU 10 that controls drives of a solenoid valve for gear shift and the like.

Hereinafter, the configuration of the ECU is described by taking the ECU 10 for EFI as an example, because the ECUs 10 have similar configurations to each other. The ECU 10 for EFI includes: an input circuit 2 that performs to input signals from various sensors 1; a microcomputer 3 configured by including a CPU, a ROM and a RAM (all are not shown) for performing various arithmetic controls through capturing signals from the input circuit 2; an output circuit 4 that outputs a signal for driving an actuator 5 on the basis of a control signal computed by the microcomputer 3; a communication circuit 11 that performs processing for data communication with the other ECUs 10, 10, . . . which are connected through the network 12; a diagnosis circuit 6 that constantly monitors a presence or absence of an abnormality in the sensor 1, the actuator 5, a wire harness (not shown) or the like, and makes a failure code recorded at occurrence of abnormality; a recording means 7 that records failure information, communication data and the like; and an external output terminal 8 for reading out information recorded in the recording means 7 to the outside. The recording means 7 is preferably a (non-volatile) ROM, an EEPROM, or the like, in which data is not deleted even at the time of power-off and becomes usable at the time of power on again. In particular, the EEPROM is more preferable for the recording means 7, because data is not deleted even when power is not supplied.

Each of the ECUs 10, 10, . . . performs various control processes, such as to control the actuator 5, on the basis of an input signal from the sensor 1 in accordance with a control program previously stored in the microcomputer 3. Further, each of the ECUs 10, 10, . . . can perform necessary data communication with the other ECUs 10, 10, . . . through the network 12. Thus, each of the ECUs 10, 10, . . . can control a state of the vehicle.

Next, it will describe about the sensor 1 connected to each ECU 10 and a controlled unit, such as the actuator 5, which is controlled on the basis of the input signal from the sensor 1. In the ECU 10 for EFI, the microcomputer 3 is connected through the input circuit 2 to various sensors on the vehicle as the sensor 1, for example, a throttle position sensor for monitoring an opening of a throttle, a crank angle sensor for monitoring a rotational speed of the engine, a water temperature sensor for monitoring a cooling state of the engine, and a starter switch for monitoring the drive of a starter motor. Further, the microcomputer 3 in the ECU 10 for EFI is connected through the output circuit 4 to various actuators on the vehicle as the actuator 5, for example, an injector for adjusting a fuel injection amount of the engine, an igniter that supplies power to a spark plug, and an idling-rotation-number control step motor. In addition, in each of the other ECUs 10, 10, . . . , the microcomputer 3 is connected through the input circuit 2 to one or a plurality of sensors 1 corresponding to an object to be controlled, and through the output circuit 4 to the object to be controlled.

Figure 2:
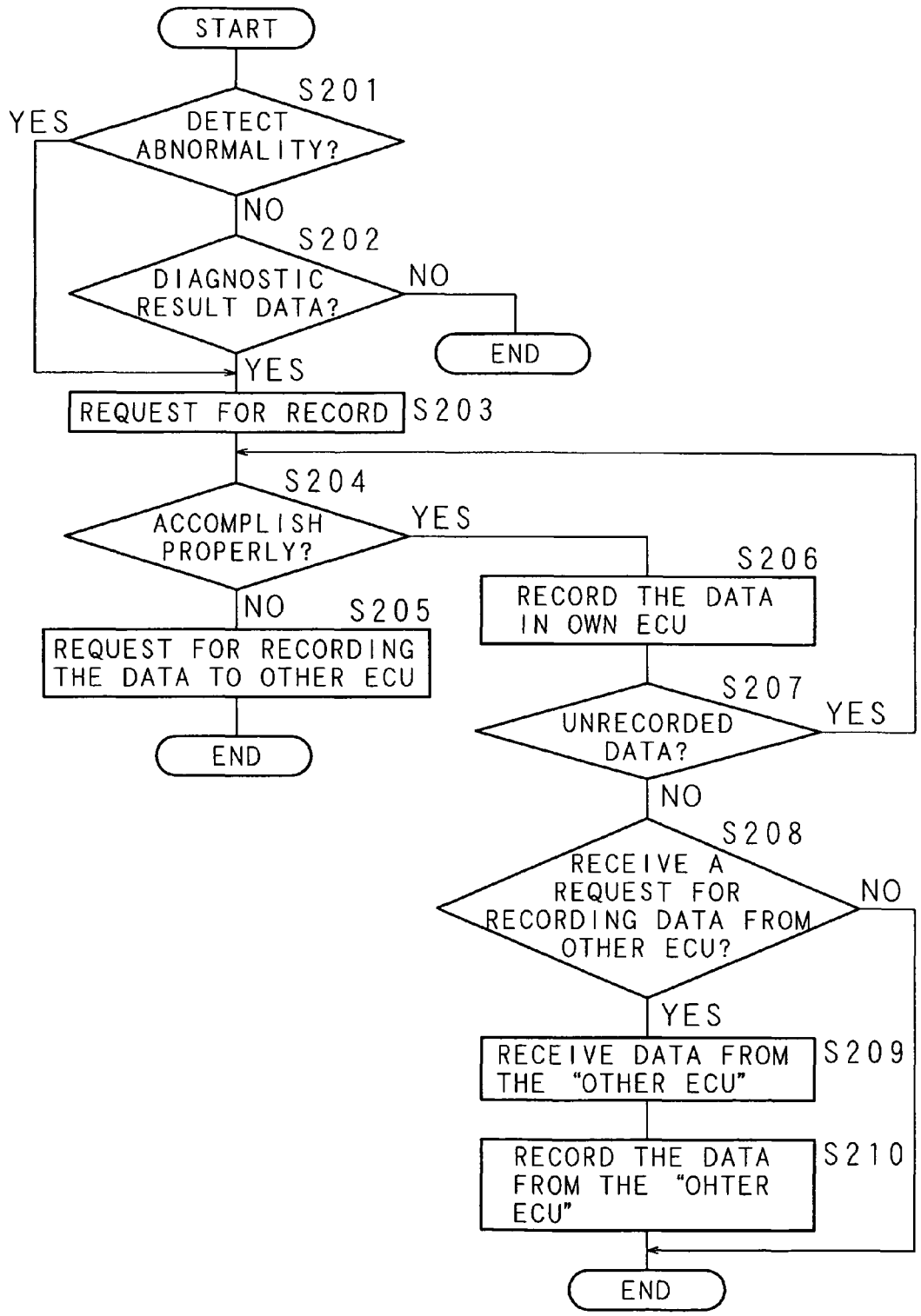
FIG. 2 is a flowchart showing a procedure of processing in ECU.

Described next is a record processing that is executed by the microcomputer 3 of the ECU 10 at occurrence of abnormality, in the vehicle information system including the ECU 10, 10, . . . according to the embodiment. FIG. 2 is a flowchart showing a procedure in the ECU 10.

The microcomputer 3 of the ECU 10 determines whether or not any abnormality has been detected (step S201). When determining that abnormality does not have been detected (step S201: NO), the microcomputer 3 determines that the ECU 10 functions properly. Then, the microcomputer 3 determines whether or not the diagnosis circuit 6 has outputted a diagnostic result data (step S202). When determining that the diagnosis circuit 6 does not have outputted a diagnostic result data (step S202: NO), the microcomputer 3 determines that data to be recorded in the recording means 7 is not present. Then, the microcomputer 3 completes the procedure.

When determining that abnormality has been detected (step S201: YES), and when determining that the diagnosis circuit 6 has outputted a diagnostic result data (step S202: YES), the microcomputer 3 requests for recording (alternatively) data that corresponds to the occurred abnormality or the diagnostic result data, into the recording means 7 provided in the own ECU 10 (step S203). The microcomputer 3 determines whether or not the request for recording will be accomplished properly (step S204).

When the microcomputer 3 determines that the request for recording will not be accomplished properly (step S204: NO), such as when the recording means 7 has recording capacity full failure, or when the recording means 7 is during a failure, the microcomputer 3 transmits the data that corresponds to the occurred abnormality or the diagnostic result data, as well as the request for recording the data, to other ECU(s) 10 (step S205).

When the microcomputer 3 determines that the request for recording will be accomplished properly (step S204: YES), such as when the recording means 7 has a sufficient capacity for recording, and when the recording means 7 functions properly, the microcomputer 3 records the data that corresponds to the occurred abnormality or the diagnostic result data in the recording means 7 which is provided within the own ECU 10, in accordance with the request for recording (step S206). The microcomputer 3 then determines whether or not unrecorded data is present (step S207). When determining that unrecorded data is present (step S207: YES), the microcomputer 3 returns the procedure to step S204, and repeats the forgoing procedure.

When determining that unrecorded data is not present (step S207: NO), the microcomputer 3 determines whether or not the ECU 10 of the microcomputer 3 has received a request for recording data from other ECU 10 (step S208). When determining that the ECU 10 of the microcomputer 3 does not have received a request for recording data from other ECU 10 (step S208: NO), the microcomputer 3 terminates the procedure. When determining that the ECU 10 of the microcomputer 3 has received a request for recording data from other ECU 10 (step S208: YES), the microcomputer 3 receives data that is an object to be recorded from the "other ECU 10" (step S209). Then, the microcomputer 3 records the data in the recording means 7 within the own ECU 10 of the microcomputer 3 (step S210).

The procedure may include a process that periodically checks the presence of the request for recording, although the procedure described above includes an interrupting process to record into the own ECU 10 the data received from the "other ECU 10".

Figure 3:
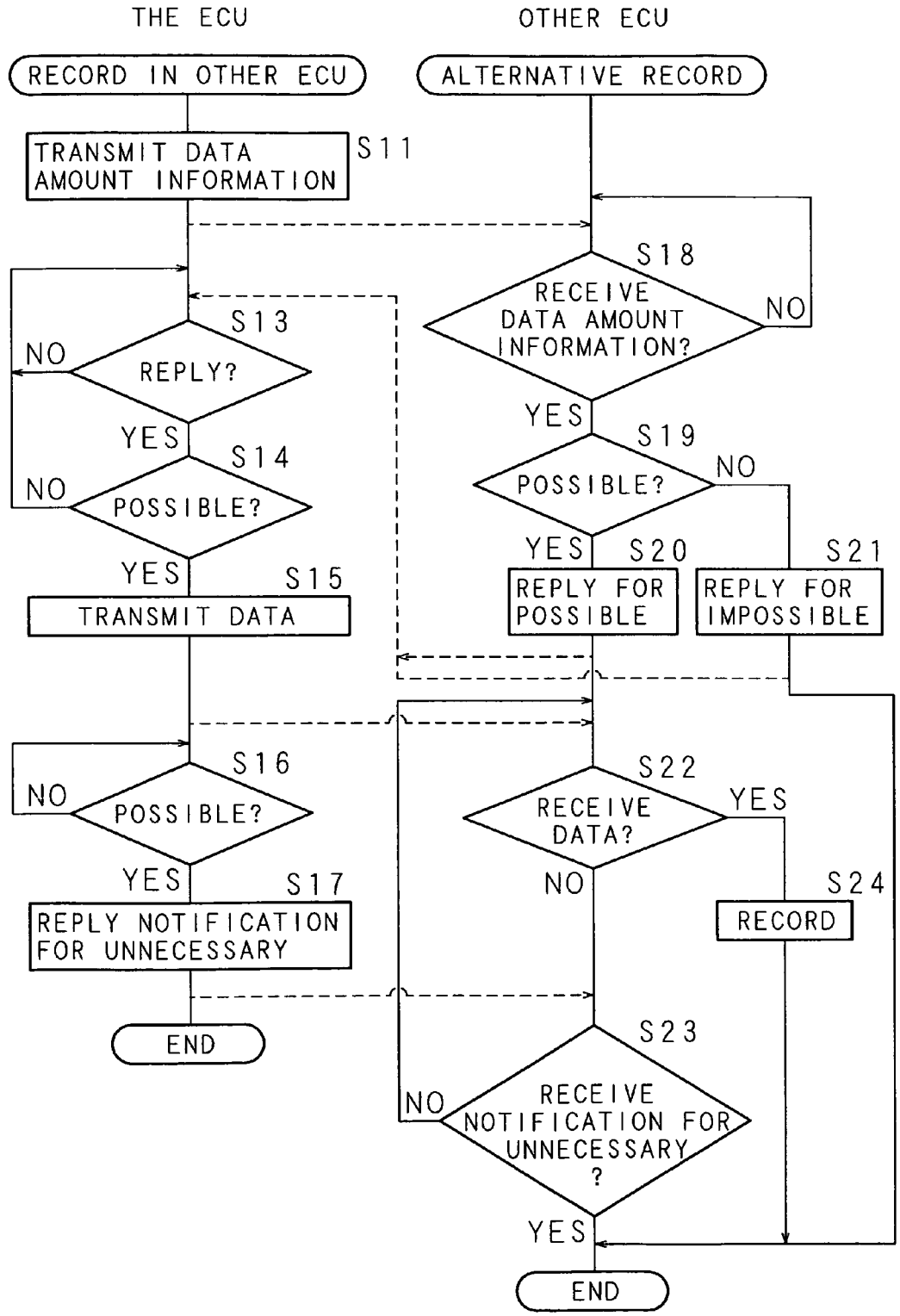
FIG. 3 is a flowchart showing a procedure of processing in regard to writing in another ECU.

FIG. 3 is a flowchart showing a procedure for recording in other ECU 10.

When determining that abnormality of the ECU 10 has been detected, the microcomputer 3 of the ECU 10 transmits a data amount information for the data to be recorded, to other ECU(s) 10 (step S11).

The microcomputer(s) 3 of the "other ECU(s) 10", to which this data amount information has been transmitted, receives the data amount information (step S18). Then, the microcomputer(s) 3 of the "other ECU(s) 10" determines whether or not alternative record is possible, such as by comparison between the received data amount information and a remaining capacity of own recording means 7 (step S19). After the determination, the microcomputer(s) 3 of the "other ECU(s) 10" transmits a reply representing "alternative record is possible" or "alternative record is not possible" (steps S20, S21).

The ECU 10, which has the occurrence of the abnormality, is waiting for a reply from the "other ECU(s) 10" (step S13). When receiving the reply representing "alternative record is possible" (step S14), the ECU 10 transmits data to one ECU 10 of first to transmit the reply representing "alternative record is possible" (step S15). When receiving plural replies representing "alternative record is possible" (step S16), the ECU 10 notifies the ECU(s) 10 having sent the reply, without the "one ECU 10 of first", that the alternative recording is not necessary (step S17).

When an ECU 10 receives data to be alternately recorded (step S22), the ECU 10 records the data in the own recording means 7 (step S24). When an ECU 10 receives the notification that the recording is not necessary (step S23), the ECU 10 terminates the procedure.

In the above procedure, the data amount information may be transmitted to a plurality of other ECUs 10. Then, the alternative record is performed by the "one ECU 10 of first" to transmit the reply representing "alternative record is possible". However, the procedure may includes a process to transmit the data amount information in an appropriate order to the other ECUs 10 until receiving the reply representing "alternative record is possible".

Figure 4:
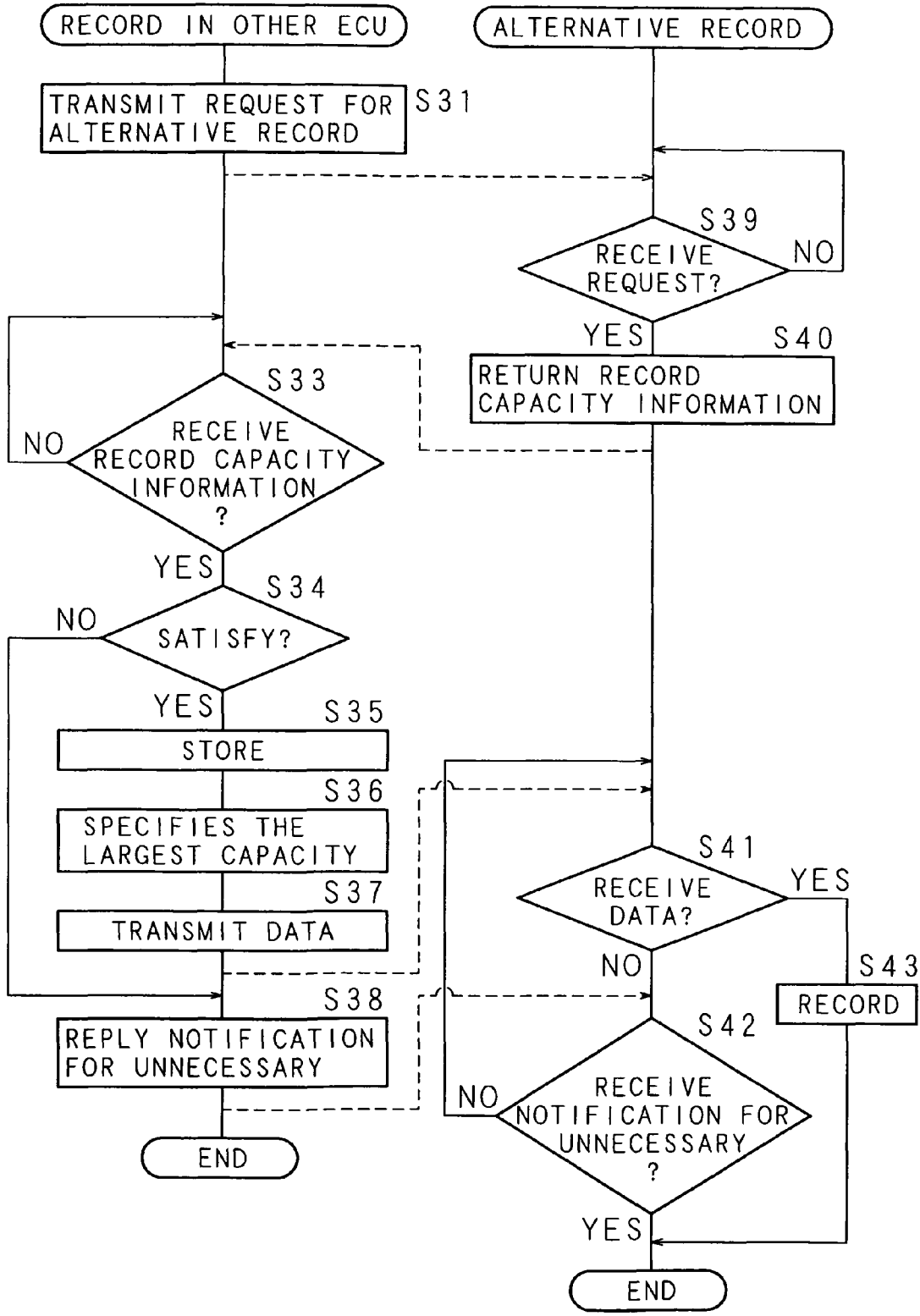
FIG. 4 is a flowchart showing a procedure of processing in a case of transmitting to and recording data in an ECU having a capacity capable of alternative recording.

FIG. 4 is a flowchart showing a procedure that an ECU 10 having the occurrence of the abnormality transmits "requests for the alternative record" simultaneously to other ECUs 10. This procedure includes a process to make the "other ECUs 10" return record capacity information for own recording means 7. This record capacity information represents possible amount to apply for the alternative record. The ECU 10 having the occurrence of the abnormality transmits the data of the alternative record to an ECU 10, which has a sufficient capacity for the alternative record, among the "other ECUs 10".

First, the ECU 10 having the occurrence of the abnormality transmits "requests for the alternative record" simultaneously to other ECUs 10 (step S31).

Each of the "other ECUs 10" having received the request (step S39) detects own record capacity, and returns record capacity information that represents possible amount to apply for the alternative record (step S40).

The ECU 10 having received the record capacity information (step S33) determines whether or not the received record capacity information satisfies the alternative record (step S34), by comparison between the received record capacity information and the data amount for alternative record. When the received record capacity information satisfies the alternative record, the ECU 10 having received the record capacity information stores information to specifying the ECU(s) 10 that has returned this satisfactory record capacity information (step S35). When the received record capacity information does not satisfy the alternative record, the ECU 10 having received the record capacity information notifies the ECU(s) 10 having returned this unsatisfactory record capacity information that the alternative record is not necessary (step S38). The ECU 10 then specifies the ECU 10 having the largest capacity among the ECUs 10 having returned satisfactory record capacity information (step S36). The ECU 10 then transmits the data of the alternative record to the specified ECU 10 (step S37). The ECU 10 notifies the other ECUs 10 among the ECUs 10 having returned satisfactory record capacity information, that the alternative record is not necessary (step S38).

When receiving the data of the alternative record (step S41), the ECU 10 records the data of the alternative record in the own recording means 7 (step S43). When receiving the notification that the alternative record is not necessary (step S42), the ECU 10 terminates the procedure.

In the embodiment described above, an ECU 10 for the alternative record is decided on a case-by-case basis. However, an ECU 10 for the alternative record may be decided in accordance with a table that stores information, in advance, for one or a plurality of ECUs 10 to perform the alternative record. In other words, the data of the alternative record may be transmitted to a suitable ECU 10 in reference with the table that is prepared in advance, and then the data of the alternative record is recorded in the suitable ECU 10. In this case, the table may be provided in each of the ECUs 10 or a predetermined ECU(s) 10. In the case that the table is provided in a predetermined ECU 10, an ECU 10 having the occurrence of the abnormality can obtain information to select an ECU 10 for the alternative record, by access to the table provided in the predetermined ECU 10.

FIG. 5, is an explanatory view showing suggestions for the table provided in the ECU 10. In the suggestions, the table includes: "ECU ID"s for identifying each ECU 10; free space information for identifying free space (byte amount) in a recording means of each ECU 10; priority order information for transmitting data preferentially; destination information for identifying each ECU 10 to which the data is transmitted; and possibility information for showing whether or not the alternative record is possible in each ECU 10.

Because the table includes the free space information for identifying free space (byte amount) in a recording means of each ECU 10, it is possible for the ECU 10 having the occurrence of the abnormality to specify the ECU 10 having the largest capacity, without inquiry as to record capacity information that is possible to apply for the alternative record in other ECUs 10, although the flowchart in FIG. 4 shows the ECU 10 having the occurrence of the abnormality needs the inquiry when requesting the alternative record.

To acquire the free space information, an ECU 10 may inquire about free space (byte amount) preliminarily to other ECUs 10 and then the "other ECUs 10" return information for the free space (byte amount), as at the steps S31 and S33 shown in the flowchart of FIG. 4. When each ECU calculates free space (byte amount) in own recording means each time the "each ECU" performs data record, it is possible to identify the free space (byte amount) at each time point.

The priority order information may be set at design time. In the priority order information of FIG. 5, the larger value represents to be the more preferential. In addition, it may be configured that the smaller value represents to be the more preferential. Further, it may be configured that the "zero" value represents inhibition for data transmission. In a case where an abnormality occurs and the alternative record is required, the ECU 10 can transmit data preferentially to the ECU 10 with a higher rank in the priority order.

The destination information may consist of ID for identifying the ECU 10 having recorded the alternative data in accordance with the request for the alternative record. When an ECU having the occurrence of the abnormality allows a different ECU 10 to record alternatively, the ECU 10 having the occurrence of the abnormality writes an "ECU ID" of the "different ECU 10" to which the data of the alternative record is transmitted, into the table. In a case where the "different ECU 10" returns information representing the success or the failure of the alternative record, the ECU 10 having the occurrence of the abnormality may store the written "ECU ID" of the ECU 10 when the returned information represents the success. FIG. 5 shows that the ECUs 10 with "ECU ID" of "0001" and "0002" respectively record diagnostic result data for themselves. Meanwhile, FIG. 5 shows that the ECU 10 with "ECU ID" of "0001" records a diagnostic result data for an ECU 10 with "ECU ID" of "0003" because of insufficient free space of the recording means in the ECU 10 with "ECU ID" of "0003". Further, FIG. 5 shows that the ECU 10 with "ECU ID" of "0001" records a diagnostic result data for an ECU 10 with "ECU ID" of "0004" because of "zero" free space of the recording means in the ECU 10 with "ECU ID" of "0004".

It is possible to identify an ECU 10 for reading out a diagnostic result data in reference to the table even when the diagnostic result data is necessary to be read out after being recorded, because the table includes the destination information. For example, even when a diagnostic result data of one ECU 10 is inquired from the outside, the table can accomplish more rapid response for reading out the diagnostic result data. When the destination information additionally includes address information that represents an address of the diagnostic result data in the "ECU 10 recording the diagnostic result data", as well as the information for identifying the "ECU 10 recording the diagnostic result data", the table can accomplish further more rapid response for reading out the diagnostic result data.

The possibility information can represent whether or not the free space of the recording means 7 is insufficient, or whether or not the ECU 10 has been inhibited to record due to an occurrence of a failure (1: recording is possible/0: recording is not possible). In FIG. 5, the ECU 10 with "ECU ID" of "0004" is set to be "0: recording is not possible" because of "zero" free space. Therefore, the ECU 10 having the occurrence of the abnormality can recognize that the ECU 10 with "ECU ID" of "0004" is not a suitable ECU 10 for transmitting the data of the alternative record, because the ECU 10 with "ECU ID" of "0004" has the inhibition for the data transmission. Thus, it is possible to avoid wasted transmissions of data, data amount, inquiry, and the like.

Each ECU 10 may transmit, such as destination information and free space information, to each of the ECUs 10 having the table or a predetermined ECU(s) 10 having the table.

The table as shown in FIG. 5 can allow the ECU 10 having the occurrence of the abnormality to promptly identify an ECU 10 for transmitting the data of the alternative record. At step S205 in the flowchart of FIG. 2, the ECU 10 having the occurrence of the abnormality transmits the data that corresponds to the occurred abnormality or the diagnostic result data, as well as the request for recording the data, to other ECU(s) 10. At this time, the ECU 10 having the occurrence of the abnormality may transmit the data and the request preferentially to an ECU 10 with the highest rank in the priority order. At step S11 in the flowchart of FIG. 3, the ECU 10 having the occurrence of the abnormality transmits data amount information for the data to be recorded, to other ECU(s) 10. And then the ECU 10 having the occurrence of the abnormality transmits the data of the alternative record to the "one ECU 10 of first" to transmit the reply representing "alternative record is possible". At this time, the ECU 10 may transmit the data amount information for the data to be recorded to other ECUs 10, on the basis of the priority order after referring the table. In addition, the ECU 10 having the occurrence of the abnormality may transmit the data amount information, on the basis of descending order for free space after referring the table.

In the present invention, it is possible to make a single ECU 10 perform alternative record by a variety of methods as described above. Therefore, the present invention has advantages to prevent wasted record and to save recording means.

It is to be noted that, when the alternative record may be failed for some reason, the failed alternative record can be compensated by returning information representing the success or the failure of the alternative record to the ECU 10 having requested the alternative record and by re-transmitting the data of the alternative record from the ECU 10 having requested the alternative record to an additional ECU 10. On the other hand, the request of the alternative record or the data of the alternative record may be transmitted from the failed ECU 10 for the alternative record to other ECU 10.

As described, according to the present embodiment, it is possible to record the data in a recording means 7 of other ECU(s) 10 that is connected through the network 12, even when the one ECU 10 has the recording means 7 which cannot record the data in a case such the recording means 7 has insufficient amounts of remaining capacity for recording or defects. Thus, there are advantages to prevent data loss and to enhance reliability for recording data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims or equivalence of such metes and bounds thereof are therefore intended to be embraced by the claims.

What is claimed is:

1. An electric control system comprising:
a plurality of electric control devices that are connected each other to perform data communication through a communication line for controlling an operation of an object to be controlled, wherein
one electric control device among the plurality of electric control devices comprises:
a recording unit that records data;
a transmitting unit that transmits data to another electric control device among the plurality of electric control devices;
a receiving unit that receives data from the another electric control device; and
a determining unit that performs a determination whether the recording unit can record data to be received by the receiving unit or not,
wherein,
the determination performed by the determining unit is based on a judgment whether on the recording unit there remains a recording space for an amount of the data to be received by the receiving unit, and a judgment whether a malfunction exists on the recording unit;
the recording unit of the one electric control device records data determined to be recordable by the determining unit of the one electric control device;
the transmitting unit of the one electric control device transmits an amount information of data determined to be non-recordable by the determining unit of the one electric control device to the another electric control device;
the transmitting unit of the one electric control device transmits the data determined to be non-recordable by the determining unit of the one electric control device to the another electric control device, when the determining unit of the another electric control device determines that the data determined to be non-recordable by the determining unit of the one electric control device can be recorded; and
the recording unit of the another electric control device records the data determined to be non-recordable by the determining unit of the one electric control device.

2. The electric control system of claim 1, further comprising:
an information communicating unit that transmits and receives information representing a possibility of alternative record of the determined data to be non-recordable, between the plurality of electric control devices, wherein
the plurality of electric control devices consist of more than three electric control devices; and
the determined data to be non-recordable is transmitted to an electric control device that represents to be possible to record alternatively, among the plurality of electric control devices excluding the one electric control device, on the basis of the information of the information communicating unit.

3. The electric control system of claim 2, wherein
the information communicating unit comprises:
an obtaining section that obtains a data amount of the data transmitted by the transmitting unit; and
an alternative record determining section that determines the possibility of alternative record, on the basis of the data amount.

4. The electric control system of claim 3, wherein
the information communicating unit transmits and receives the information representing a possibility of alternative record, between the plurality of electric control devices excluding an electric control device that is determined to be impossible to record alternatively.

5. The electric control system of claim 3, wherein
the transmitting unit transmits the determined data to be non-recordable to an electric control device which is first to transmit information representing that alternative record is possible.

6. The electric control system of claim 2, wherein
the information communicating unit comprises:
a request receiving section that receives a request for alternative record from the one electric control device; and
a transmitting section that transmits data amount information which is required to record alternatively to the plurality of electric control devices excluding the one electric control device, on the basis of the request.

7. The electric control system of claim 6, wherein
the transmitting unit transmits the determined data to be non-recordable to an electric control device which transmits information representing the largest data capacity for alternative record.

8. The electric control system of claim 2, wherein
the one electric control device comprises a record information obtaining unit that obtains an information whether the determined data to be non-recordable has been properly recorded in the electric control devices which represents to be possible to record alternatively, and
when the record information obtaining unit obtains an information that the determined data to be non-recordable has not been recorded properly in the electric control device which represents to be possible to record alternatively, the determined data to be non-recordable is transmitted to an electric control device among the plurality of electric control devices excluding the electric control device that has not recorded properly the determined data to be non-recordable and the one electric control device.

9. The electric control system of claim 2, wherein
each of the plurality of electric control devices comprises:
a record determining unit that determines whether the data received by the receiving unit has been recorded properly or not; and
a transferring unit that transfers the information representing a possibility of alternative record to an electric control device among the plurality of electric control devices excluding the electric control device that has not recorded properly the determined data to be non-recordable and the one electric control device, when the record determining unit determines that the data received by the receiving unit has been recorded properly.

10. The electric control system of claim 1, further comprising:
a table that registers an electric control device to which the determined data to be non-recordable should be transmitted.

11. The electric control system of claim 10, wherein
the table registers an electric control device to which the determined data to be non-recordable is prevented from being transmitted.

12. The electric control system of claim 10, wherein
the table registers a priority level of transmitting the determined data to be non-recordable, with respect to each of the electric control devices to which the determined data to be non-recordable should be transmitted.

13. The electric control system of claim 10, wherein
each of the plurality of electric control devices comprises the table.

14. The electric control system of claim 10, wherein
a predetermined electric control device among the plurality of electric control devices comprises the table, and
the one electric control devices accesses the table when the determining unit determines the recording unit cannot record.

15. The electric control system of claim 1, further comprising:
an identification information storing unit that stores an identification information to identify an electric control device that has properly recorded the determined data to be non-recordable which is transmitted by the transmitting unit.

16. The electric control system of claim 1, wherein
each of the plurality of electric control devices comprises an abnormality detecting unit that detects an abnormality with respect to the operation of the object to be controlled, and
the data recorded by the recording unit represents to have detected the abnormality.

17. The electric control system of claim 1, wherein
each of the plurality of electric control devices comprises a diagnostic unit that performs self-diagnosis whether functioning properly or not, and
the data recorded by the recording unit is related to a diagnostic result by the diagnostic unit.

18. An electric control device that controls an operation of an object to be controlled, comprising:
a receiving unit;
a determining unit that performs a determination whether a recording unit for recording data to be received by the receiving unit can record or not,
wherein,
the determination performed by the determining unit is based on a judgment whether on the recording unit there remains a recording space for an amount of the data to be received by the receiving unit, and a judgment whether a malfunction exists on the recording unit;
a record controlling unit that allows to record the data when the determining unit determines the recording unit can record the data; and
an outputting unit that externally outputs an amount information of data, when the determining unit determines the recording unit cannot record the data.

19. The electric control device of claim 18, further comprising:
an abnormality detecting unit that detects an abnormality of the operation of the object to be controlled; wherein
the data recorded by the recording unit represents to have detected the abnormality of the operation of the object to be controlled.

20. The electric control device of claim 18, further comprising:
a self-diagnosing unit that diagnoses itself whether functioning properly, wherein
the data recorded by the recording unit represents information corresponding to a diagnostic result by the self-diagnosing unit.

* * * * *